United States Patent [19]

Kempton

[11] Patent Number: 4,774,803
[45] Date of Patent: Oct. 4, 1988

[54] SNOW AND LEAF THROWING BLADES

[76] Inventor: Roger E. Kempton, 55 W. Prospect St., Nanuet, N.Y. 10954

[21] Appl. No.: 78,118

[22] Filed: Jul. 27, 1987

[51] Int. Cl.[4] ............................................. A01D 34/73
[52] U.S. Cl. ..................................... 56/295; 56/16.9; 37/243
[58] Field of Search ....................... 56/295, 16.9, 17.5, 56/255; 37/241, 242, 243

[56] References Cited

U.S. PATENT DOCUMENTS

| | | | |
|---|---|---|---|
| 2,836,029 | 5/1958 | Johnson | 37/243 |
| 3,015,929 | 1/1962 | Bright | 37/243 |
| 3,048,869 | 8/1962 | Beatty | 37/243 |
| 3,051,972 | 9/1962 | Lacy | 56/295 |
| 3,636,685 | 1/1972 | Speckman | 56/295 |
| 4,217,708 | 8/1980 | Preuatt et al. | 37/243 |
| 4,257,214 | 3/1981 | Ferguson et al. | 56/295 |
| 4,308,676 | 1/1982 | Doanne | 56/16.9 |

Primary Examiner—John Weiss
Attorney, Agent, or Firm—Leon Gilden

[57] ABSTRACT

Several embodiments of snow and leaf throwing blades designed to replace a conventional rotary lawn mower blade are disclosed. In one embodiment, a downwardly extending vertical bar member is attached to a rotary lawn mower blade and operates to discharge leaves or snow from the lawn mower. In a second embodiment, the downwardly extending vertical blade is curvilinearly shaped to more efficiently discharge debris from the mower. In a third embodiment, the bar is particularly designed to mulch leaves and grass before discharge, and includes a plurality of downwardly extending tines or rods to effect the combined mulching and discharge operation.

1 Claim, 3 Drawing Sheets

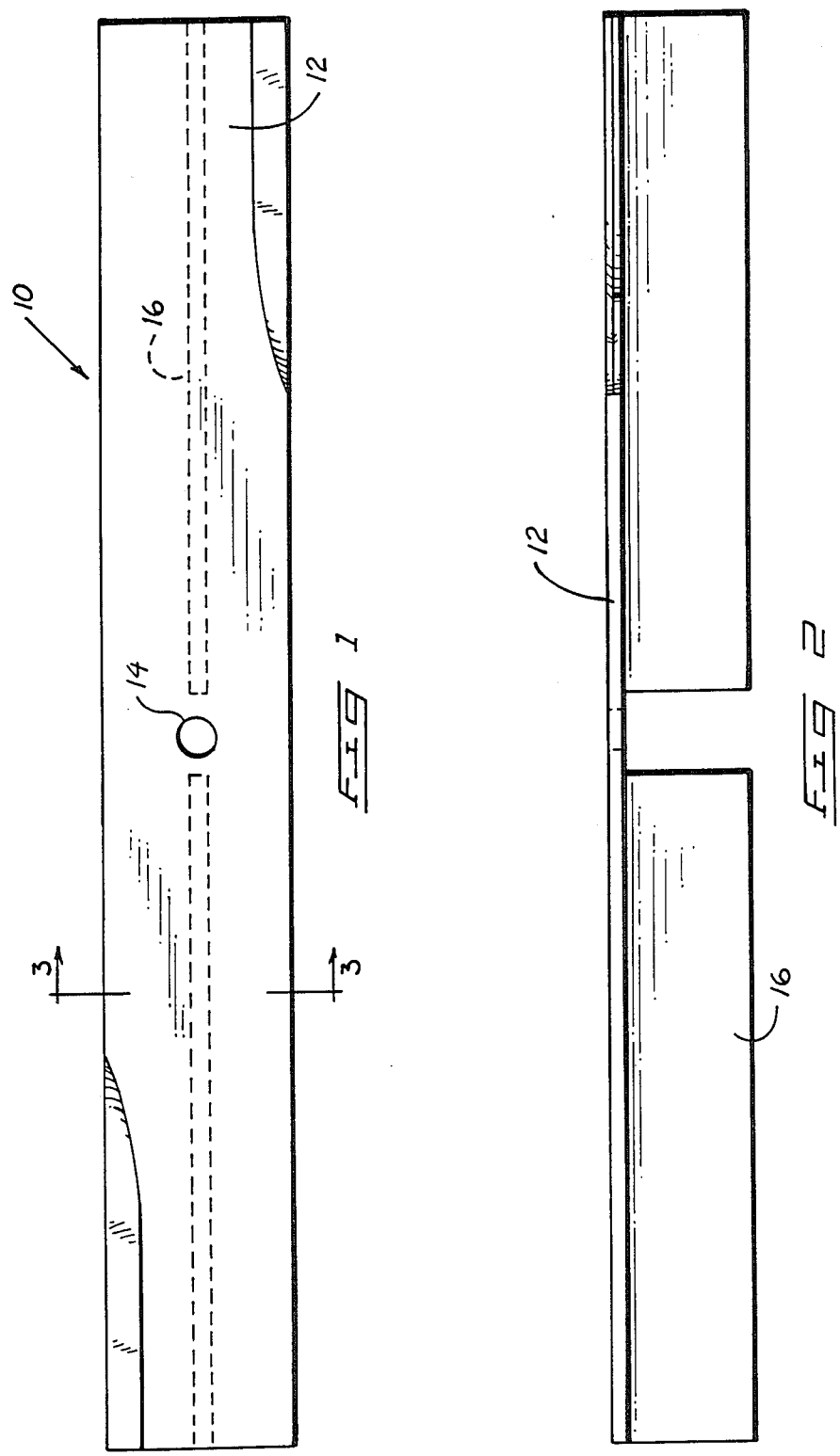

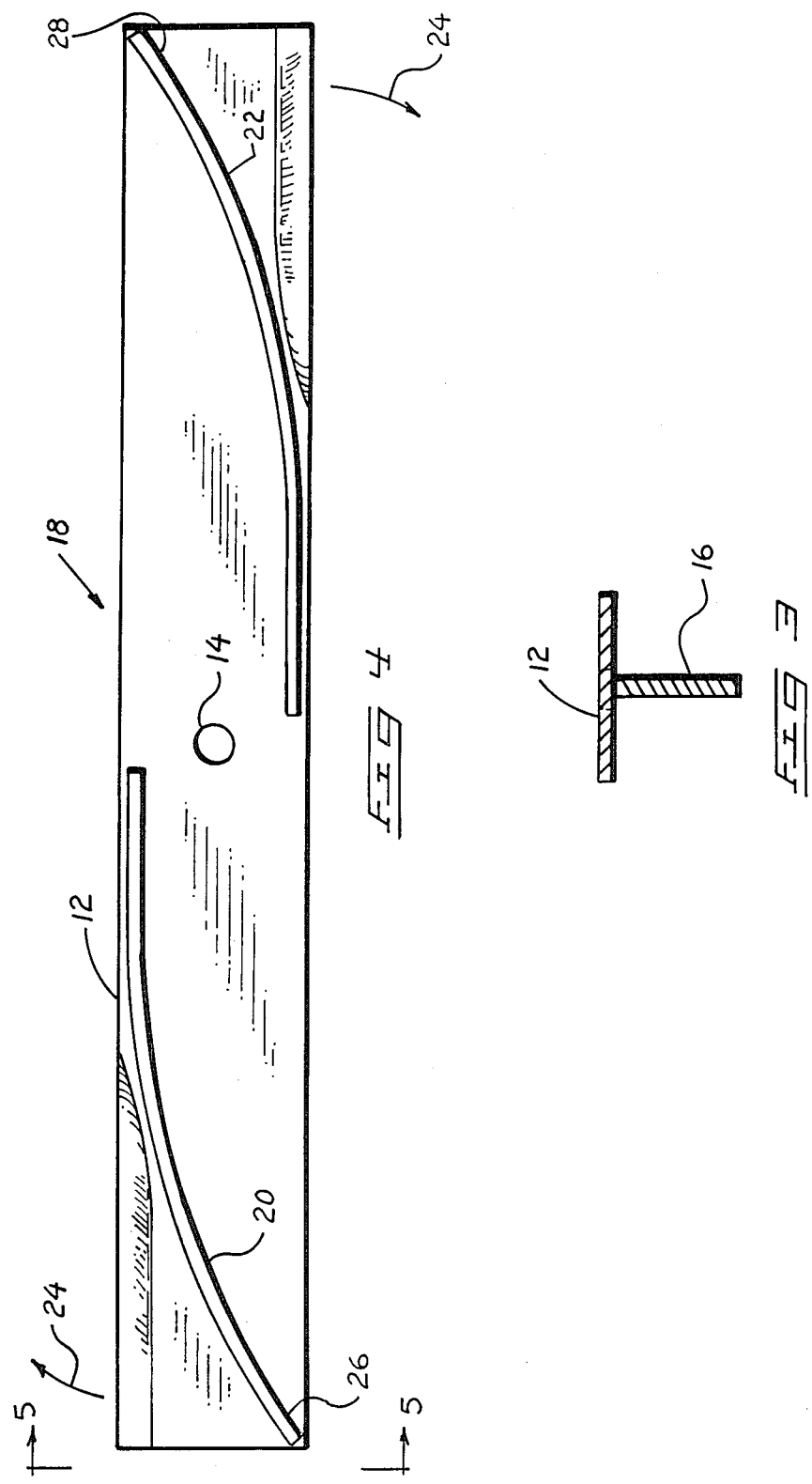

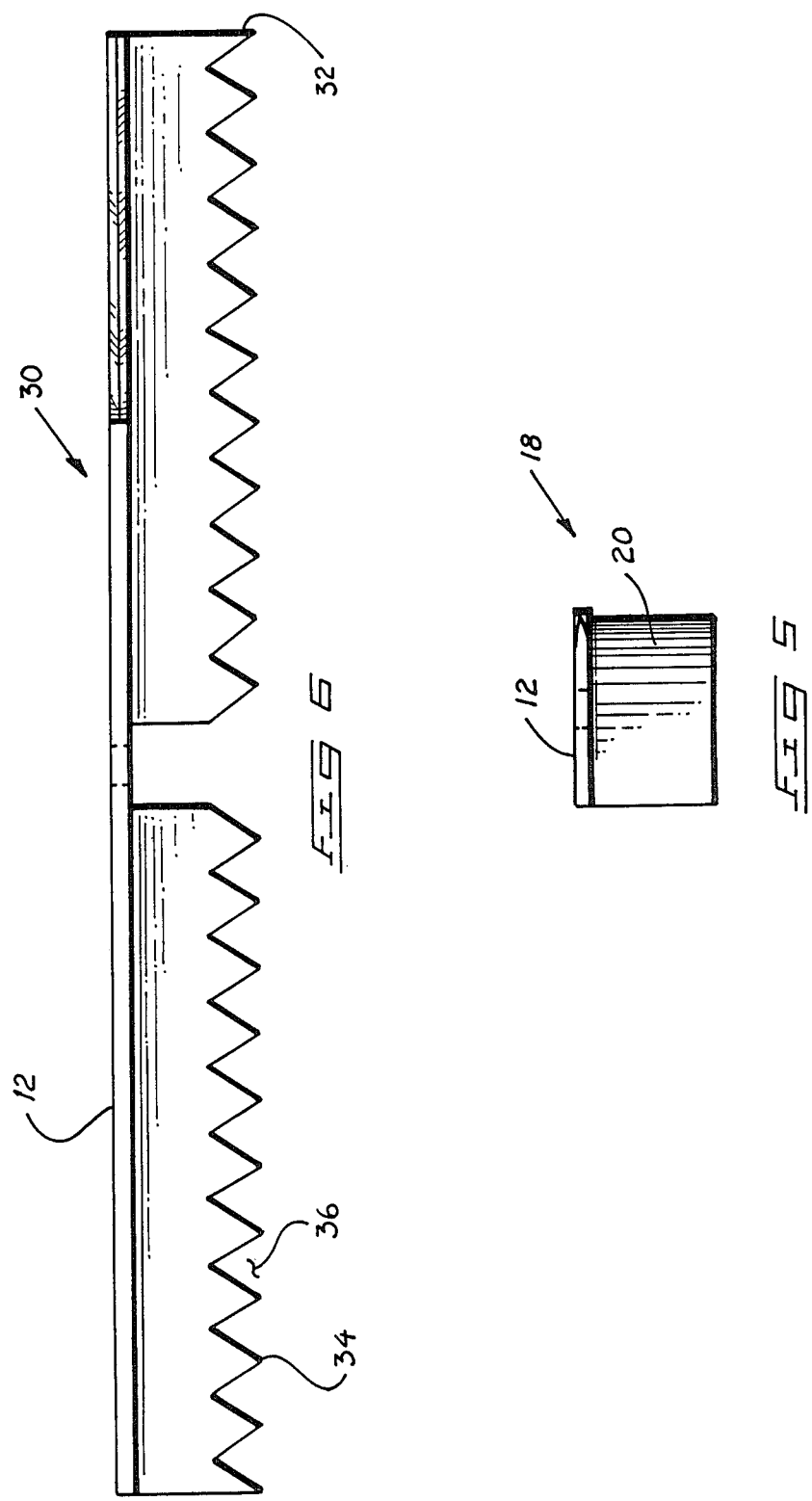

SNOW AND LEAF THROWING BLADES

BACKGROUND OF THE INVENTION

1. Field of the Invention

The present invention relates to harvesting and cutting machines, and more particularly pertains to new and improved lawn mower blades which are particularly designed for throwing snow and for mulching and discharging leaves from a lawm mower.

2. Description of the Prior Art

The use of specially designed lawn mower blades with conventional lawn mowers for the purpose of performing operations other than cutting grass is well known in the prior art. A good example of such a prior art modified lawm mower blade is to be found in U.S. Pat. No. 3,589,112, which issued to L. Frohmader on June 29, 1971. More specifically, this patent discloses a thatcher attachment for a rotary type lawm mower wherein such attachment comprises a pair of generally V-shaped spring wire rake members which are carried at the same radius on opposite ends of an elongated bar substantially similar to a conventional lawn mower blade. The rake members operate to cut weeds and leaves into small pieces prior to their discharge from the lawn mower.

While the basic concept of attaching other types of structures to a lawm mower blade is illustrated by the above-described patent, it can be appreciated that there are no presently available prior art devices which facilitate the use of a conventional lawm mower as a snow thrower or an efficient leaf mulcher. As such, there would appear to be a continuing need for modified lawn mower blade structures which could accomplish such snow throwing and leaf mulching operations, and the present invention substantially addresses this need.

SUMMARY OF THE INVENTION

In view of the foregoing disadvantages inherent in the known types of lawn mower blades now present in the prior art wherein such blades cannot be easily modified to function as snow throwing or leaf mulching devices, the present invention provides for improved rotary lawn mower blade constructions wherein such blades can be utilized to efficiently throw snow or to mulch and discharge leaves in a rapid and efficient manner. As such, the general purpose of the present invention, which will be described subsequently in greater detail, is to provide new and improved modified lawn mower blade structures which have all the advantages of the prior art lawn mower blade constructions and none of the disadvantages.

To attain this, a first embodiment of the present invention includes the use of a downwardly extending bar member attached to a conventional rotary lawm mower blade, such bar member extending along the complete elongated length of the blade and being substantially orthogonally aligned therewith. The downwardly extending vertical bar member serves to capture snow and leaves and to propel them in a circular direction so that centrifugal force will eject the snow or leaves from the lawn mower discharge opening. In a second embodiment of the invention, the downwardly extending vertical bar is curvilinearly shaped in a manner which presents a convex surface in the direction of blade rotation. The curvilinear shape allows leaves or snow to more efficiently travel along the length of the blade in response to experienced centrifugal forces, thus to effect the desired discharge thereof from the lawm mower.

In a third embodiment of the invention, the downwardly extending bar member is provided with a plurality of tines through the formation of aligned notches, and this embodiment of the invention is particularly used for mulching leaves and grass. More particularly, the tines serve to cut the leaves and grass into small pieces while the alignment of the tines are such as to gradually effect the desired discharge of the mulch from the lawn mower in response to the aforementioned effect of centrifugal force.

There has thus been outlined, rather broadly, the more important features of the invention in order that the desired description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out it various ways. Also, it is to be understood that the phraseology and terminology employed herein is for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoig abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved modified lawn mower blade which has all the advantages of the prior art modified lawn mower blades and none of the disadvantages.

It is another object of the present invention to provide a new and improved modified lawn mower blade which may be easily and efficiently manufactured and marketed.

It is a further object of the present invention to provide a new and improved modified lawn mower blade which is of a durable and reliable construction.

An even further object of the present invention is to provide a new and improved modified lawn mower blade which is susceptible of a low cost of manufacture with regard to both materials and labor, and which accordingly is then susceptible of low prices of sale to the consuming public, thereby making such modified lawn mower blades economically available to the buying public.

Still yet another object of the present invention is to provide a new and improved modified lawn mower blade which provides in the apparatuses and methods of the prior art some of the advantages thereof, while simultaneously overcoming some of the disadvantages normally associated therewith.

Still another object of the present invention is to provide a new and improved modified lawn mower blade which permits the use of a rotary lawn mower as a snow thrower.

Yet another object of the present invention is to provide a new and improved modified lawn mower blade which permits the use of a rotary lawn mower as a leaf mulcher.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top plan view of a first embodiment of the modified lawn mower blade comprising the present invention.

FIG. 2 is a front elevation view of the first embodiment of the invention.

FIG. 3 is an end elevation view of the invention taken along the line 3—3 in FIG. 1.

FIG. 4 is a bottom plan view of a second embodiment of the invention.

FIG. 5 is an end elevation view of the second embodiment of the invention.

FIG. 6 is a front elevation view of a third embodiment of the invention.

DESCRIPTION OF THE PREFERRED EMBODIMENTS

With reference now to the drawings, and in particular to FIGS. 1, 2 and 3 thereof, a first embodiment of a new and improved lawn mower blade embodying the principles and concepts of the present invention and generally designated by the reference numeral 10 will be described.

More specifically, it will be noted that the first embodiment 10 of the invention essentially comprises a conventional rotary lawn mower blade 12 having a centrally disposed through-extending aperture 14 which facilitates an attachment of the blade to the lawn mower in a well known manner. Fixedly secured to the blade 12 is a downwardly extending flat bar 16 which extends along the entire axial length of the blade while being substantially orthogonally aligned therewith. The downwardly extending bar 16 is desirably attached to the blade 12 by some known conventional means, such as by welding, threaded fasteners, or the like, and as such, the bar 16 can be either integrally or separably attached to the blade. Accordingly, the use of a bar 16 which may be removably attached to a lawn mower blade 12 is well within the intent and scope of the present invention.

With respect to the manner of use and operation of this first embodiment 10 of the invention, it can be appreciated that the bar 16 will rotate at high speed with the blade 12 and will serve to push snow or leaves positioned forwardly thereof. Further, the rapid rotation of bar 16 will cause the leaves or snow to rotate in a circular direction whereby centrifugal force will cause the movement of the snow or leaves towards the radially opposed ends of the blade. The snow or leaves will then be ejected outwardly through the discharge opening of the lawnmower.

FIGS. 4 and 5 illustrate a modified embodiment of the invention which is generally designated by the reference numeral 18. In this modified embodiment 18, the conventional lawn mower blade 12 has a pair of downwardly extending substantially orthogonally aligned bars 20, 22 integrally or otherwise separably attached thereto. The desired direction of rotation of the blade 12 is illustrated by the arrows 24 and as such, it can be seen that the bars 20, 22 are curvilinearly shaped with their respective remote edges 26, 28 trailing the direction of rotation. As such, convex snow or leaf contacting surfaces are presented by the bars 20, 22 in the direction of rotation, and the curvilinear shape then facilitates a movement of debris and snow along the convex surfaces under the influence of centrifugal force. In effect, the curvilinear shape of the bars 20, 22 more efficiently effect the discharge of snow and leaves from the lawn mower during a use thereof. Accordingly, the manner of usage and operation of the second embodiment 18 of the invention is substantially similar to that of the first embodiment 10, and no further description of the manner of usage and operation will be provided.

It is also within the intent and purview of the present invention to utilize bar attachments which are strictly designed for leaf and debris mulching, while not being particularly utilizable for a snow throwing operation. In this regard, FIG. 6 of the drawings illustrates a third embodiment of the invention which is generally designated by the reference numeral 30 and which includes a downwardly extending bar member 32 either integrally or otherwise separably attached to the conventional lawn mower blade 12. As illustrated, the bar member 32 includes a plurality of tines 34 defined by aligned notches 36. The tines 34 may be provided with various degrees of sharpness and also conceivable variations in shape to thus provide different degrees of mulching efficiency.

As to the manner of usage and operation of this third embodiment 30 of the invention, it can be appreciated that leaves and other debris will be torn apart by the tines 34 during a rotation of the blade 12, and the mulched debris will be allowed to slide through the notches 36 so as to be repeatably struck by the tines. By the same token, the mulch will gradually experience an increase in its speed of movement, thereby to allow the effects of centrifugal force to eventually discharge the mulch from the lawn mower opening.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved lawn mower blade assembly for facilitating a use of said blade for a purpose other than cutting grass, said blade assembly comprising:

lawn mower blade means operably attachable to a rotary lawn mower in a conventional manner; said lawn mower blade means defined by first and second parallel longitudinal edges including a coextensive and aligned cutting edge formed on each of said parallel longitudinal edges, and each of said cutting edges of finite length less than that of said parallel longitudinal edges, and bar means operably attached to said lawn mower blade means along an axial length thereof, said bar means serving to capture and push snow, leaves and other debris forwardly of said blade means during a rotation thereof, whereby centrifugal force may effect an ejectment of said snow, leaves and other debris from a discharge opening forming a part of said lawn mower, and wherein said bar means is integrally and orthogonally attached to a bottommost surface of said lawn mower blade means, and wherein said bar means includes first and second bars wherein each of said first and second bars are curvilinearly shaped, and of a convex surface for contacting said snow, leaves and other debris in a direction of rotation of said lawn mower blade means, and wherein each of said first and second bars extends along the first of said parallel longitudinal edges and terminates adjacent the second of said parallel and longitudinal edges wherein said convex surfaces are positioned rearwardly of said cutting edges in the direction of rotation of said lawn mower blade.

* * * * *